[19] United States Patent
Gareis

[11] Patent Number: 5,000,539
[45] Date of Patent: Mar. 19, 1991

[54] WATER BLOCKED CABLE

[75] Inventor: Galen M. Gareis, Richmond, Ind.

[73] Assignee: Cooper Industries, Inc., Houston, Tex.

[21] Appl. No.: 387,860

[22] Filed: Jul. 31, 1989

[51] Int. Cl.$^5$ ............................ G02B 6/44; H02G 3/00
[52] U.S. Cl. ................................ 350/96.23; 174/70 R
[58] Field of Search ..................... 350/96.23; 174/70 R

[56] References Cited

U.S. PATENT DOCUMENTS 4,552,432  11/1985  Anderson et al. ............... 350/96.23
4,695,127  11/1987  Ohlhaber et al. ............... 350/96.23
4,711,523  12/1987  Iri et al. ........................ 350/96.23

FOREIGN PATENT DOCUMENTS 3118172  11/1982  Fed. Rep. of Germany ... 350/96.23
3337863   4/1985  Fed. Rep. of Germany ... 350/96.23

OTHER PUBLICATIONS

"Tests and Procedures for SAE 100R Series Hydraulic Hose and Hose Assemblies-SAE J343", SAE Standard, Jun. 1987, pp. 19.116-19.117, 19.108-19.109.

Primary Examiner—Akm Ullah
Attorney, Agent, or Firm—Fitch, Even, Tabin & Flannery

[57] ABSTRACT

A high resistivity cable for transmitting optical information. The cable includes a resilient buffer tube holding an optical conductor for transmitting the optical information. A high dielectric gel is packed inside of the tube to fill the space not occupied by the conductor. The cable also includes a flexible high dielectric braid surrounding the tube throughout its length for increasing the tensile strength of the cable. The interstices of the braid are filled with a high dielectric gel to prevent moisture from entering the braid. The cable also includes an electrically insulative resilient outer jacket. A method of manufacturing the cable is also disclosed.

7 Claims, 1 Drawing Sheet

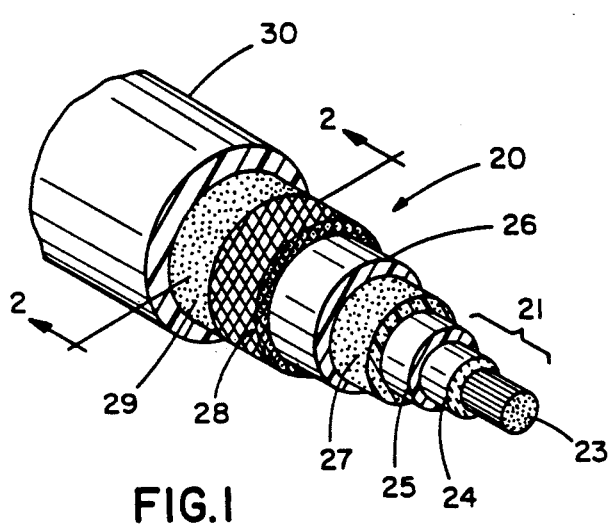
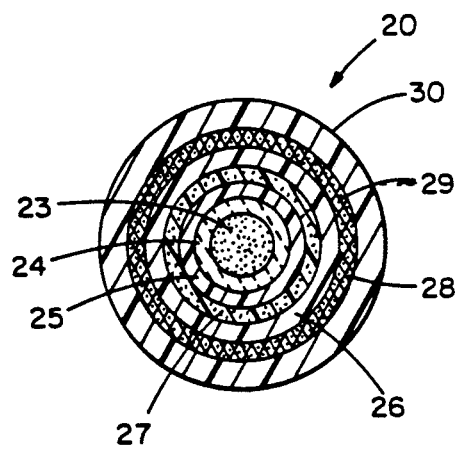
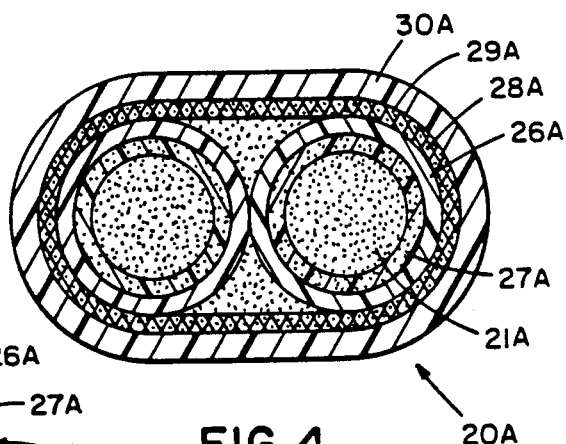
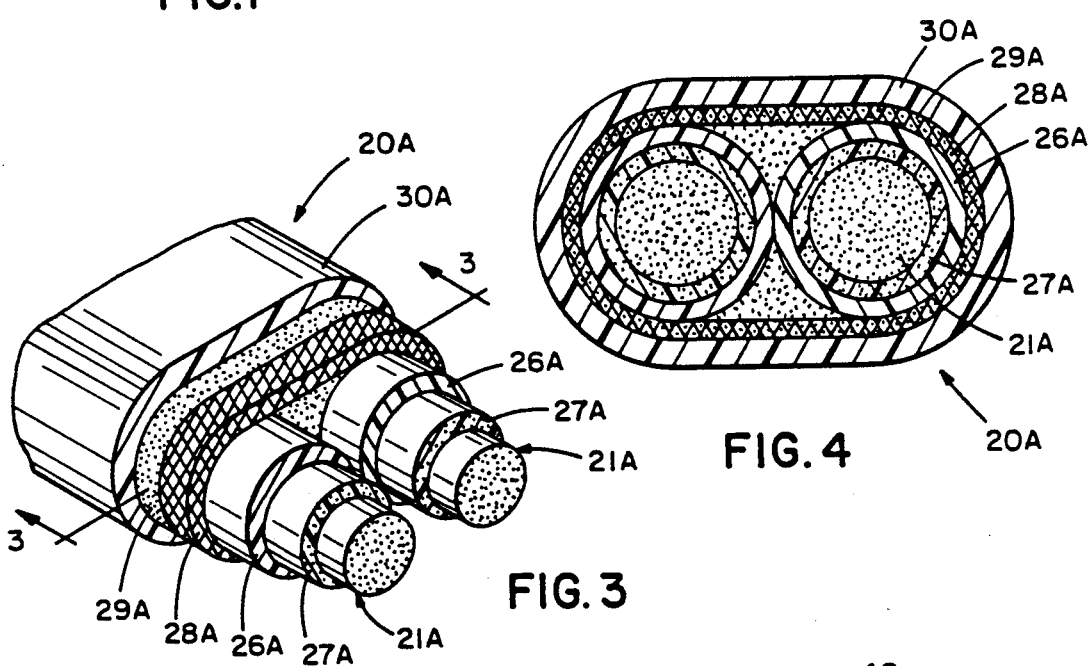
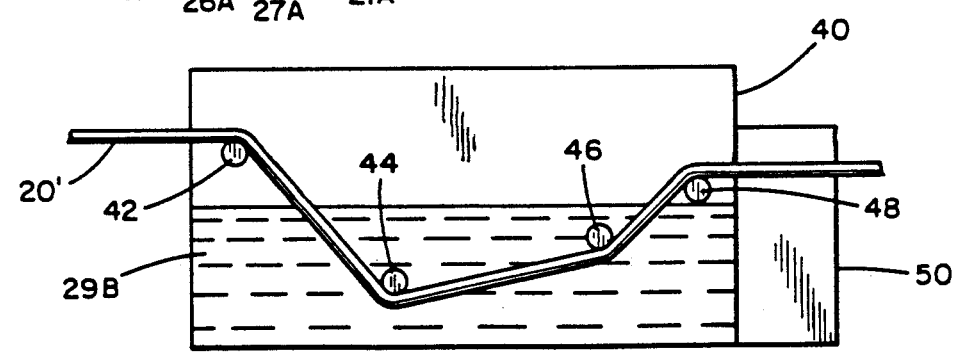

WATER BLOCKED CABLE

The present invention relates to electrical cables and, more specifically, to a cable having one or more optical conductors for use in transmitting control or instrumentation information or the like between two locations while maintaining a very high level of electrical insulation resistance between the locations. An example would be the use of a cable adjacent to high voltage electrical transmission lines where the cable or its supporting structure might contact these lines. If contact were to occur, personnel could be injured and/or equipment damaged unless the effective insulation resistance of the cable limited the resulting leakage current to ground to a safe value.

BACKGROUND OF THE INVENTION

Operators of electric utility mobile work platforms of the cherry picker type or "man baskets" are often required to be on the platform while it is positioned adjacent to high voltage electrical transmission lines to perform installation, repair or maintenance tasks. Such operation requires the platform and its supporting boom be essentially electrically isolated from ground to minimize leakage currents which otherwise could establish a hazardous electrical voltage on the platform in the event the boom, operator or "man baskets" contacted or came into close proximity to a transmission line.

A typical system for controlling operation of the boom includes hydraulic cylinders mounted on the base unit to position the boom. Control of the cylinders is typically effected using manually operated control valves mounted on the platform basket connected to the actuator cylinders by means of flexible hoses extending between the basket and the base unit. This system requires several expensive and bulky hoses to be connected to the basket. These hoses must be kept free of conductive deposits and moisture to maintain the high value of outer surface resistivity necessary to prevent establishing a hazardous electrical voltage on the platform if the boom or basket were to contact high voltage wiring.

The use of a hydraulic system controlled from the "man basket" has many disadvantages in utility service. The system is bulky, costly and requires considerable maintenance to avoid leakage of hydraulic fluid and the resultant possibility of conductive deposits on connecting hoses. Additionally, hydraulic systems may not provide adequate control or instrumentation capability for more demanding applications.

Electrical control of mobile platforms, although offering advantages of lower cost, greater control flexibility and less bulk, is undesirable if conventional electric cables are used. They are not adequately isolated from ground and have increased risk of hazardous leakage current to ground in the event of contact with the high voltage transmission lines.

Optical conductors can transmit control and instrumentation information but such conductors are fragile and may require additional provisions to increase their tensile strength and environmental resistance to be suitable for industrial use, particularly in mobile applications. Typically, this can be accomplished by placing the optical conductor in a buffer tube. For further information concerning the structure and operation of cables, including optical conductors, reference may be made to commonly assigned U.S. Pat. Nos. 4,695,127 and 4,552,432.

SUMMARY OF THE INVENTION

Among the several aspects and features of this invention may be noted the provision of an improved optical cable with very high effective surface resistivity and which is unaffected by moisture, is flexible, reliable in use, less bulky, has long service life and is economical to manufacture. The invention provides a method of filling the synthetic fiber braid jacket wound over the buffer tube with high dielectric gel. This method involves drawing the buffer tube assembly through a bath which contains a quantity of heated gel maintained at a temperature to reduce gel viscosity sufficiently to enable the gel to flow freely into the braid filling all void spaces. Other aspects and features will be in part apparent and in part pointed out in the following specification and in the accompanying claims and drawings.

Briefly, the cable of the present invention includes a resilient buffer tube and an optical conductor positioned within the buffer tube for transmitting an optical signal. The portion of the interior of the buffer tube not occupied by the optical conductor is packed with an insulating gel. A flexible, resilient, high mechanical and dielectric strength braid surrounds the tube throughout its length. The interstices of the braid are filled with an insulative gel to prevent moisture from entering the braid. Finally the cable also includes an electrically insulative resilient outer jacket. The gel filling the voids in the braid prevents moisture from reducing the electrical resistance of the cable.

As a method of making a cable, the present invention includes several steps: (1) a tank is at least partially filled with a dielectric insulating gel; (2) the gel is heated until its viscosity is reduced sufficiently to allow the gel to flow freely; (3) the incipient cable is drawn through the heated gel until the gel fills essentially all of the void spaces in the braid; (4) the cable is withdrawn from the liquefied gel; and (5) the incipient cable is cooled sufficiently that the gel congeals to permit further processing of the cable.

BRIEF DESCRIPTION OF THE DRAWINGS

FIG. 1 is a perspective view in an enlarged scale of a length of cable embodying various aspects of the present invention with outer elements of the cable removed to reveal underlying layers and elements;

FIG. 2 is a transverse cross-sectional view of the cable of FIG. 1;

FIG. 3 is a perspective view in an enlarged scale of a length of an alternate embodiment of the cable of the present invention with outer components of the cable removed to reveal underlying layers and elements;

FIG. 4 is a transverse cross-sectional view of the cable of FIG. 3; and

FIG. 5 is a diagrammatic view of a coating system used to apply a high dielectric gel to the braid surrounding a buffer tube.

Corresponding reference characters indicate corresponding components throughout the several views of the drawings.

DESCRIPTION OF THE PREFERRED EMBODIMENT

Cable performance specifications for service such as cables used to provide information to utility "man baskets" were established by The Society of Automotive Engineers (SAE) originally for hydraulic hoses, but will be later modified to include optical cables. These specifications typically limit maximum acceptable leakage current when a predetermined voltage is applied between two spaced points along the length of the cable. Optical cables are required to meet this test requirement after being immersed in water for a one hour period. Effective surface resistance is a function of the parallel combination of surface resistivity of the outer surface of the cable and internal cable dielectric resistivity of the cable structure. The presence of moisture within a cable will decrease dielectric resistivity and consequently decrease effective surface resistance. In practice, internal moisture can lower effective surface resistivity sufficiently to render an affected cable unsuitable for utilization in applications similar to utility "man baskets". Preventing water from affecting the dielectric property of a cable, commonly referred to as "water blocking", is particularly important in optical cables. The cable of the present invention utilizes a unique high dielectric gel filled braid jacket and buffer tube gel packing as water blocking means to retain high surface resistivity after exposure to high moisture levels.

Referring now to the drawings, one preferred embodiment of the cable of the present invention for transmitting optical information is generally indicated in FIGS. 1 and 2 by reference character 20. The cable 20 is useful for transmitting optical information, for example, to and from a mobile work platform commonly referred to as a "man basket" in electric utility applications, derricks and other similar equipment where electrical insulation of the operator and/or equipment from ground is required to prevent injury or damage to equipment.

More specifically, as indicated in FIGS. 1 and 2, the cable includes an optical conductor 21 which may be of the type comprising a commercially available glass fiber assembly core. The fiber assembly core has a glass fiber center 23 for transmitting light, a glass cladding 24 for reflecting light back into the center, and an ultraviolet cured acrylate sleeve 25, applied at the time of manufacture of the glass and cladding, for mechanical protection of the glass. The fiber assembly core 21 is disposed in a buffer tube 26 which is packed with a high dielectric type insulative gel 27 to provide a high dielectric and water blockage between fiber assembly core 21 and buffer tube 26. The buffer tube 26 can be of a somewhat rigid but resilient thermoplastic material, such as polycarbonate.

A synthetic fiber braid 28 of a material such as Kevlar, is applied to the outer surface of the buffer tube 26 to increase tensile strength of the cable while maintaining cable flexibility. A coating 29 of high dielectric, insulative gel is applied to the braid 28 in a manner such that the gel fills essentially all void spaces within said braiding, and, if required, the gel can impregnate individual braid fibers. The function of gel coating 29 is to block water from entering the cable by filling void spaces within the braid that could become filled with water and decreasing water absorption of individual braid fibers. Of course, the entry of moisture inside the cable would lower its electrical resistance.

The cable also includes a high resistivity, protective outer jacket 30 preferably formed of a tough, abrasion resistant thermoplastic material. The jacket 30 is extruded over the gel coating 28 so as to prevent water from entering the cable.

An alternate preferred embodiment of the cable of the present invention is generally indicated at reference character 20A of FIGS. 3 and 4. Components of cable 20A generally corresponding to components of cable 20 are indicated with the addition of the suffix "A". Cable 20A includes a plurality of buffer tubes 26A, for example two, each of which encloses an optical conductor 21A, held centered by a packing of gel 27A. The plurality of filled buffer tubes is overwrapped with fiber braid 28A, which braid is filled with dielectric gel 29A as described previously. The cable also includes a protective outer jacket 30A preferably formed of a tough, moisture resistant, very high surface resistivity, abrasion resistant thermoplastic material such as polyethylene.

Referring to FIG. 5, a representative method is shown to apply dielectric gel 29 to braid 28. A tank 40 can be of any suitable construction and size and is provided with appropriate heating devices such as electrical resistance heating elements (not shown). The tank is partially filled with the dielectric gel shown as 29B which is heated to a temperature sufficient to reduce viscosity of the gel to a value which will allow the gel material to flow freely. The viscosity of the heated gel 29B is sufficiently low to allow the gel to flow readily into the interstices of the braid 28 as the incipient cable 20', without the jacket 30, is drawn through the gel bath. The cable 20' is drawn through the tank 40 by an external means (not shown), such as a powered take up reel used in cable manufacturing, over a series of guide rollers 42, 44, 46 and 48 which provide a path of sufficient length through the bath to insure the gel material has adequately penetrated and filled essentially all of the void spaces in the braid layer 28. The cable 20' is drawn from the heated bath and through a cooling chamber generally shown as 50 which may contain cooling fans or other such devices (not shown) to lower the temperature of the gel material and increase its viscosity to facilitate further processing of the cable.

As a method of filling and impregnating a synthetic fiber braid which strengthens an optical cable, the present invention includes several steps: (1) a suitable tank is at least partially filled with a high dielectric insulating gel; (2) the gel is heated causing its viscosity to be reduced sufficiently to allow the gel to flow freely; (3) the incipient cable is drawn through the tank causing the heated gel to fill substantially all of the interstices of the braid and at least partially impregnate individual braid fibers; (4) the incipient cable is withdrawn from the tank; and (5) the cable is cooled to cause the gel to congeal and allow further processing of the cable.

In view of the above, it will be seen that the several objects of the invention are achieved and other advantageous results are attained.

While the embodiments disclosed herein are preferred, it will be appreciated that they are merely examples and that various alternatives, modifications or improvements may be made by those skilled in the art from this teaching, which are intended to be encompassed by the following claims.

What is claimed is:

1. A high resistivity cable for transmitting optical information, said cable being free of electrically conductive components and comprising:
   a resilient buffer tube,
   an optical conductor, having an outer diameter less than the inner diameter of said buffer tube, disposed within said buffer tube for transmitting said optical information, resilient dielectric means filling the interior space between said tube and said optical conductor, a flexible, resilient, high dielectric braid surrounding said tube throughout its length for increasing tensile strength of the cable, coating means filling the interstices of said braid to prevent moisture from entering said braid; and an electrically insulative resilient outer jacket, said braid maintaining said tube spaced from said outer jacket whereby said coating means prevents moisture from reducing the resistance of said cable.

2. A cable as set forth in claim 1 wherein said coating means is high dielectric, insulating gel.

3. A cable as set forth in claim 1 wherein said high dielectric braid is a synthetic fiber wrap layer.

4. A cable as set forth in claim 3 wherein said coating means includes a high dielectric insulating gel.

5. A cable as set forth in claim 4 wherein said resilient dielectric means is a high dielectric insulating gel.

6. A cable as set forth in claim 1 comprising a plurality of said optical conductors and a corresponding plurality of said tubes with one conductor positioned in each said tube.

7. A method of filling and impregnating a synthetic fiber braid strengthening jacket of a cable comprising:
   a resilient buffer tube,
   an optical conductor disposed inside said tube,
   a packing of high dielectric gel filling all interior space within said tube not occupied by said optical conductor, and
   a synthetic fiber matrix jacket surrounding said tube throughout its length, said method comprising the steps of:
   (a) at least partially filling a suitable tank with a high dielectric insulating gel,
   (b) heating said gel until its viscosity is reduced sufficiently to allow the gel to flow freely,
   (c) drawing said cable through said heated gel material until the gel fills essentially all void spaces in said matrix braid and has at least partially impregnated individual braid fibers,
   (d) withdrawing said cable from said liquefied gel, and
   (e) cooling said cable to cause said gel to congeal and allow further processing of said cable.

* * * * *